(12) United States Patent
Roemer

(10) Patent No.: US 8,532,284 B2
(45) Date of Patent: Sep. 10, 2013

(54) TELEPHONE

(75) Inventor: Bernhard Roemer, Duisburg (DE)

(73) Assignee: FHF Funke + Huster Fernsig GmbH, Muelheim an der Ruhr (DE)

( * ) Notice: Subject to any disclaimer, the term of this patent is extended or adjusted under 35 U.S.C. 154(b) by 777 days.

(21) Appl. No.: 12/748,636

(22) Filed: Mar. 29, 2010

(65) Prior Publication Data

US 2011/0116622 A1    May 19, 2011

(30) Foreign Application Priority Data

Nov. 19, 2009    (EP) .................................... 09014455

(51) Int. Cl.
  *H04M 1/00*    (2006.01)
  *H04M 9/00*    (2006.01)

(52) U.S. Cl.
  USPC ................................ 379/428.02; 379/428.01

(58) Field of Classification Search
  USPC .............. 379/419, 428.01, 428.02, 429, 436; 362/24, 88
  See application file for complete search history.

(56) References Cited

U.S. PATENT DOCUMENTS 2,572,089 A * 10/1951 Laporte .......................... 362/24
6,711,257 B1    3/2004 Vassallo ................... 379/387.01

FOREIGN PATENT DOCUMENTS

| DE | 3513153 | 10/1986 |
| DE | 8606944 | 4/1987 |
| DE | 8715481 | 2/1988 |
| DE | 20308060 | 9/2003 |

\* cited by examiner

*Primary Examiner* — Tuan D Nguyen
(74) *Attorney, Agent, or Firm* — Andrew Wilford

(57) ABSTRACT

A telephone has a housing, a handset, and a cradle on the housing constructed to transmit and emit light and fit with the handset. A light source in the housing juxtaposed with the cradle can be energized to feed light into the cradle for emission thereby. The light source can be LEDs mounted on a printed-circuit board underneath a base plate carrying the light-conducting cradle.

13 Claims, 2 Drawing Sheets

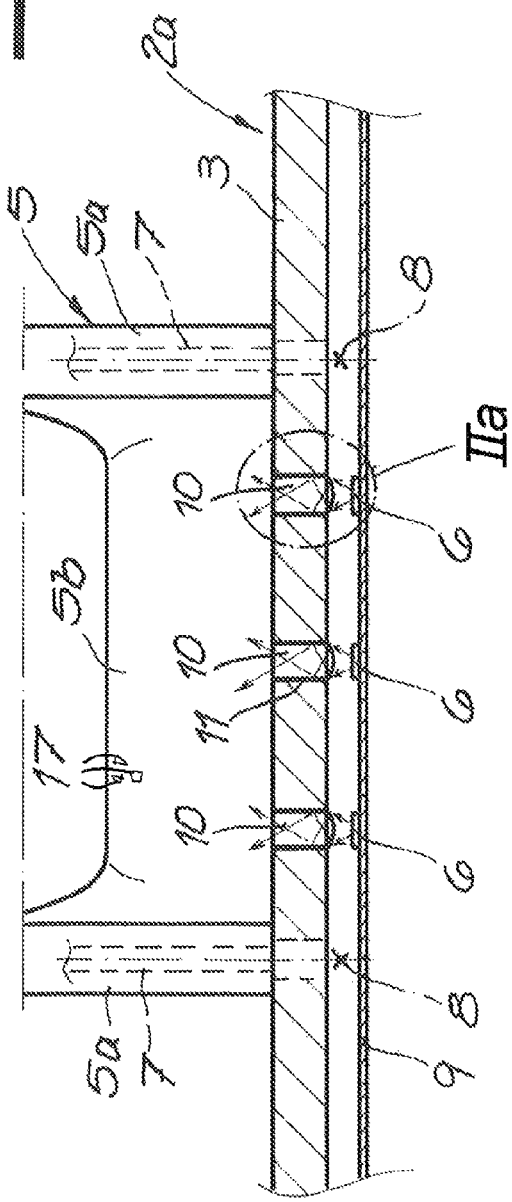
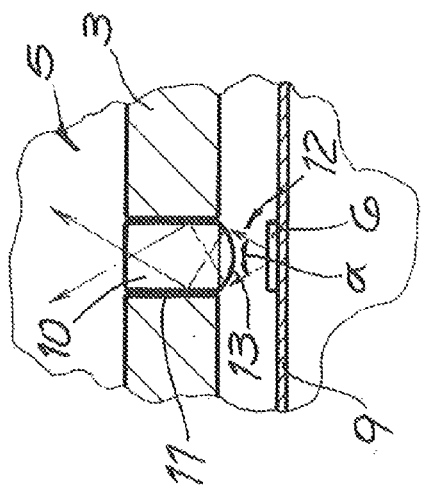

TELEPHONE

FIELD OF THE INVENTION

The present invention relates to a telephone.

BACKGROUND OF THE INVENTION

A typical telephone, in particular an industrial telephone, has a handset, a housing, and a display.

Telephones of this type generally serve as means of communication for transmitting sound, and particularly voices by means of electric signals. Industrial telephones are further characterized by a particularly robust construction and are advantageous for use in, for example, wet or dusty environments, as well as generally under any harsh conditions.

Industrial telephones as used in practice are often equipped with a closed housing having a door that when closed protects the handset. Since the handset is inside the housing in order to protect the entire unit from unfavorable environmental conditions, such as in a tunnel, within a chemical plant, or railway track system, etc., additional measures are required in order to be able to signal an incoming call. To this end a relay has mostly been previously hooked into the line connected to the telephone so as to actuate a for example external lamp or loudspeaker to signal an incoming call. In this manner any personnel near the telephone, such as security personnel, may be optically and/or acoustically informed of an incoming call. Such measures are extensive, because an external lamp or loudspeaker is required, and a relay or another switching element must be connected to the line.

According to the prior art of DE 203 08 060 a portable telephone has a display that incorporates signaling means. Such signaling or illumination means may be a plurality of light-emitting diodes in the housing. Furthermore, a light-conducting element covering the light-emitting diodes is discussed. The light-emitting diodes may be made to blink by a controller to indicate an incoming call. This represents a modest improvement in the signaling of telephone-specific functions of the telephone.

A further system as described in DE 86 06 944 is a car phone equipped with a light source in the handset. In this manner the alerting may be recognized from the exterior.

In DE 87 15 481 a phone is described having a transparent housing. A light rod is provided inside the housing. As soon as a call is received, the pulsing of associated light sources activates and deactivates in order to create a blinking light.

U.S. Pat. No. 6,711,257 describes a telephone where an indicator is incorporated into the handset. It may be an LED in combination with a light conductor.

In DE 86 06 944 a light source is provided inside the handset underneath a lens for signaling purposes.

Finally, DE 35 13 153 describes a telephone that is equipped with a light bulb. The light bulb irradiates a luminescent plate which illuminates the entire background of the display after the operating receiver has been lifted.

The prior-art telephones have some problems. For example, one disadvantage with current industrial telephones is that the optical signal is an extra part and is somewhat complex and expensive. Furthermore, if any signal displays according to prior art are used, it becomes obvious that they are predominantly used in cell phones and are therefore integrated into the handset. Furthermore, solutions using an entire illuminated housing are not suited for industrial applications where the housing can get so dirty that it becomes opaque.

Furthermore, the cell phones described in much of the prior art do not work, for example, in tunnels, on the ocean, etc., and are therefore also not suitable in many industrial applications as an alternative to standard hard-wired telephones. Hence the known measures used in cell telephones are not suitable for such hard-wired telephone systems with a closed housing.

OBJECTS OF THE INVENTION

It is therefore an object of the present invention to provide an improved telephone.

Another object is the provision of such an improved telephone that overcomes the above-given disadvantages, in particular that is usable in a hard-wired industrial telephone where the handset is enclosed in a housing.

A further object is to provide a particularly inexpensive industrial telephone that nonetheless has a good optical signaling system.

SUMMARY OF THE INVENTION

A telephone has according to the invention a housing, a handset, and a cradle on the housing constructed to transmit and emit light and fit with the handset. A light source in the housing is juxtaposed with the cradle and can be energized to feed light into the cradle for emission thereby.

Thus, contrary to the prior art, the invention expressly does not use a separate optical signal unit in the handset, but rather one provided, for example, on the housing. Furthermore, only the cradle is configured as a light conducting/scattering unit, and not the entire housing. In this manner the housing may generally be produced from a standard stable material that is opaque. The low wall thicknesses normally associated with transparency are also avoided according to the invention. In that case the less used, elevated cradle in or on the housing forms the light conducting/scattering unit.

In this context a standard light source is not used, but instead the cradle is configured as a light guiding/scattering unit, and thus as a display. The cradle is, for example, formed to hold the handset. Generally the cradle is a fork. The handset is set on or hung up on the fork. For this purpose the form may also be equipped with a switch or sensor that detects the hung-up handset and sets the phone circuit on hook when the handset is on the fork.

Within the scope of the invention the generally known fork-shaped handset cradle used in an unchanged manner now serves and additional purpose, namely as an optical signal unit. For this purpose the handset cradle is the light conducting/scattering unit. This means that the handset cradle conducts the light emitted and fed into it by the light source. Simultaneously, the handset cradle functions as a light scattering unit in order to allow the light fed into it to exit to the exterior or to be scatter in the interior, such that a particularly impressive optical effect is achieved. This effect is enhanced when, for example, nonhomogeneities are provided in the cradle. The nonhomogeneities may be, for example, mounting holes that are required in order to connect the cradle to the housing.

Furthermore, additional nonhomogeneities provided in the cradle are also possible, such as in the form of scattering particles or bodies incorporated or imbedded in the cradle. Because the cradle is a plastic part the scattering particles in question are easy to add during the injection-molding process. It is conceivable, for example, to work with glass spheres, metal shavings, powders, granulates, etc., which are advantageously incorporated into the cradle.

Furthermore, the cradle advantageously has nonhomogeneities on its surface. These may be specific and previously formed surface irregularities that may be produced, for example, by surface treatment via blasting with glass beads, sand, etc. Additionally formed edges, ridges, grooves, etc. function as nonhomogeneities and ensure that the light fed into the cradle and emitted by the light source may selectively exit toward the exterior. This means that a complete total reflection of the light does not occur at the nonhomogeneities at the interface range between the cradle made from a transparent thermoplastic and the surrounding air, but instead the light beam in question is completely or partially scattered toward the exterior. In connection with any imbedded scattering particles optionally located in the interior, a particularly impressive luminance is imparted to the cradle in this manner, without the cradle itself being formed as a light source. In this regard the cradle functions as a light conducting/scattering unit for the light emitted by the light source and fed into the cradle.

The light source may be one or more LEDs. They may be of different colors or multicolor LEDs may be used. In this manner different functional states of the telecommunication unit may be displayed in different colors. It is conceivable to use different colors for incoming calls from different subscribers, of different types of calls, for instance red for an emergency. In general, the use of white-light LEDs is also conceivable and it is understood that this is comprised by the invention.

For this purpose the light source may generally be in the cradle. For this purpose the cradle may have one or more hollow spaces or cavities. The hollow spaces are covered by an external and usually transparent casing. As explained above, the cradle is usually produced from a transparent plastic material. In this regard the use of a transparent thermoplastic material has been proven particularly favorable. For example, polycarbonate or also polyamide may be used.

The light source may be imbedded only in the hollow space(s). To this end the light source is located mostly at the base or rear end of the cradle. After installation of the light source the one or the multiple hollow spaces are advantageously filled with a potting compound. In order to achieve an overall homogenous appearance, the potting compound is transparent. Furthermore, the potting compound is of the same optical characteristics as the surrounding plastic of the cradle. This applies particularly to the refractive index.

As an alternative the cradle may also be solid. This also applies to any mounting holes. In this case the light source is separate from the cradle and is located outside or behind the cradle. For this purpose the design will always be such that the light source is on a printed circuit board. The handset is connected via a standard cord to circuitry on the board. Such a printed circuit board already exists inside the housing anyway, for example, as a keypad board. In order to transmit the light emitted by the light source, an additional light conductor is often interconnected. The light conductor ensures that the light source is optically coupled to the cradle. Preferably the light conductor is mounted on the housing. Usually the light conductor is in a base plate on the front side of a base of the housing. The light source is below the base plate, more specifically usually on the printed-circuit keypad board. The cradle is placed above the light conductor and abuts it.

In this manner the light source is protected inside the housing below the base plate. The light conductor embedded or disposed in the housing or the base plate ensures that light emitted by the light source is subsequently fed into the overlying cradle via the light conductor.

The cradle is actually placed on top of the base plate. The mounting holes mentioned above serve for mounting it. Mostly, two mounting holes are provided, more specifically one in each of the two arms of the fork-shaped receiver cradle. The two arms are positioned on both sides of the handset such that they are next to the handset when viewed from the front, and are seen particularly well with the illumination described and effected due to their exposed positions. This applies particularly in light of the fact that the light source, and thus the cradle being illuminated in this manner, pulses corresponding to the incoming ring signal.

Both the housing and the handset received inside it are made from a thermoplastic material. For this purpose a non-transparent or opaque plastic can be used. In this manner low production costs at nearly equal stability and rigidity may be realized as in currently used thermosetting plastics or even metal housings. It is further possible to produce the door from a transparent thermoplastic material without any problems. In this manner the handset located in the interior, and particularly of the cradle is easily exposed. Since the cradle is a fork and both arms located on both sides of the handset, a strong contrast is provided particularly in case of an illuminated receiver cradle. The base plate on which the fork-shaped receiver cradle is located, is usually of a dark color, as is the handset. In contrast the cradle in an opaque or transparent manner in and of itself is already quite prominent. This applies especially in case the cradle pulses in the rhythms of the call signal. For this purpose signal colors are most often selected for the LEDs, such as a red and/or blue.

In order to feed virtually all of the light of the LED into the cradle, the light conductor usually interconnected at this location is equipped with a lens at its inner end facing the LED. The lens is realized in the simplest cases such that the light conductor has, for example, a part-spherically convex or concave end face. In any case this manner practically all of the light commonly emitted by the LED at an angle of approximately 60° is fed into the light conductor. The light conductor in question is generally cylindrical and configured has a shiny or polished end in order to guide all of the fed-in light by total reflection into the interior, and to thence feed the light into the cradle directly connected to the light conductor on the output side of the light conductor. For this purpose the light conductor and the cradle will always be configured using an identical transparent thermoplastic with regard to material. In this manner any optical losses in the transition from the light conductor to the cradle do not need to be feared. The refractive indices of both the light conductor and the cradle are matched.

All of the measures may be realized in a particularly cost-effective manner in that LEDs are used as the light source. These require no special cooling and are particularly energy efficient. This means that the electric energy already available for operation of the communication device periodically suffices in order to supply the LEDs or light source without any problems. In addition, the light emitted by the LED or the light source is fed into a large-scale voluminous body as compared to the LED, that is to say the cradle for the handset. In this manner the incoming call signal is not made into a light point, but a voluminous body, in the present case the cradle, is made to light up or glow. In this context the only modification is limited to producing the cradle either entirely or partially from a transparent thermoplastic material. This applies to the door of the housing on the front. These are the substantial advantages of the invention.

BRIEF DESCRIPTION OF THE DRAWING

The above and other objects, features, and advantages will become more readily apparent from the following description, reference being made to the accompanying drawing in which:

FIG. 2 is a section through a detail of FIG. 1;

FIG. 2a is a large-scale view of a detail of FIG. 2; and

FIG. 3 is a large-scale sectional view of an alternative structure.

SPECIFIC DESCRIPTION

Figure 1:
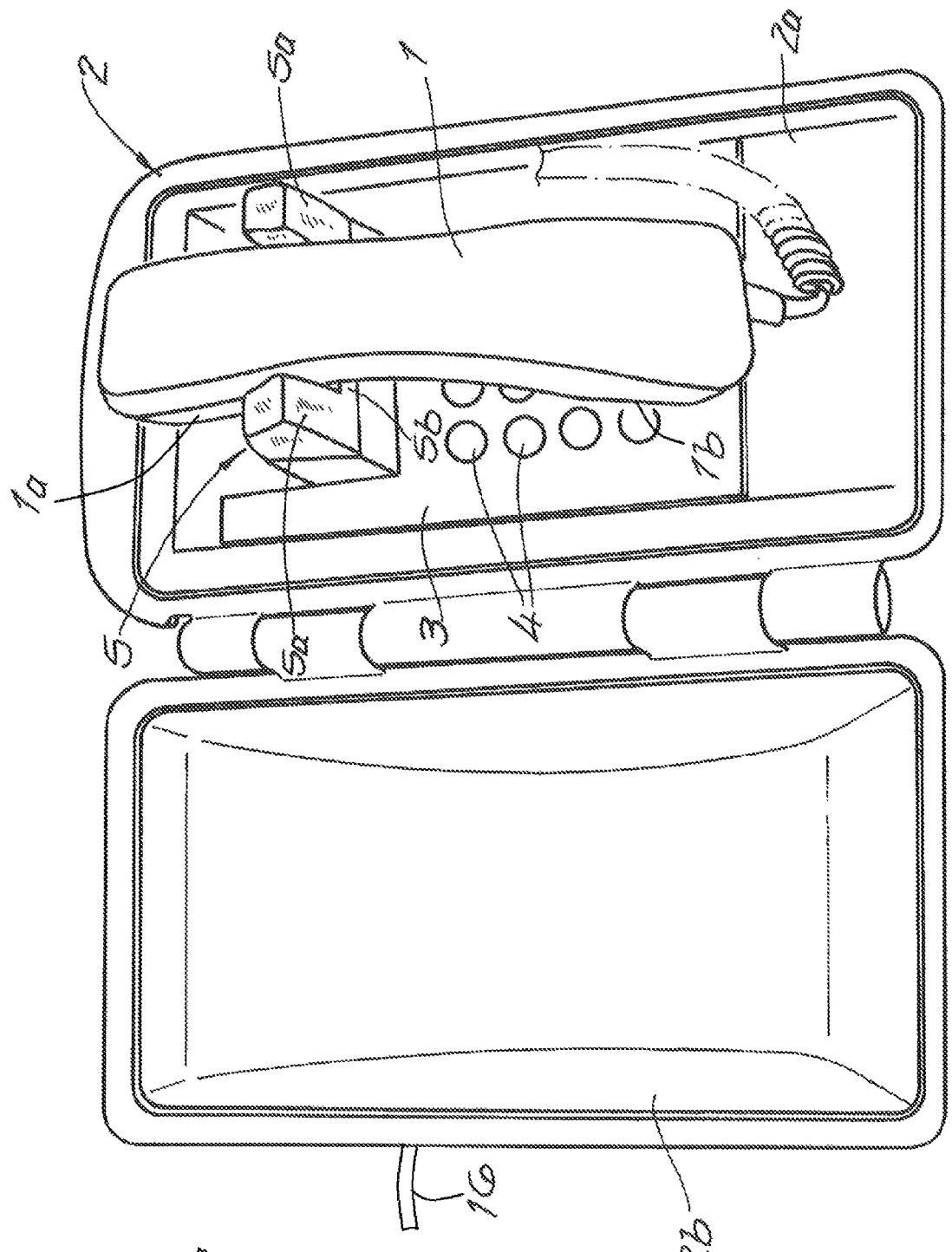
FIG. 1 is a perspective view of the telephone according to the invention with the handset in its cradle and the housing open.

As seen in FIG. 1 an industrial telephone according to the invention has a handset 1 and a housing 2 that can enclose and protect the handset 1. Here the housing 2 is made substantially entirely from plastic, preferably a thermoplastic, and has an opaque base shell 2a and a transparent cover shell 2b forming an openable and closable door. Both the base shell 2a and the cover shell or door 2b are here made from polycarbonate. The base shell 2a is somewhat concave and carries forward of its rear wall a base plate 3 in turn carrying a key pad 4 and a cradle 5 for the handset 1.

The housing 2 is usually connected to a land line 16 and fixed to a wall, although this mounting is not obligatory, particularly since the communication device may of course also be placed horizontally on a table, a ledge, etc. In any case, the handset 1 can fit in the cradle 5. To this end the cradle 5 is formed as a fork and has two arms 5a extending forward from the plate 3 and connected by a base 5b. It is obvious that the handset 1 fits in the cradle 5 between both arms 5a when on hook or hung up and overlies the base 5b with its earpiece 1a is on one side of the cradle 5 and turned toward the base plate and its mouthpiece 1b is on the other side of the cradle and also turned toward the base plate 3. The cradle 5 may also be equipped with a sensor or a switch in the base 5b in order to detect the hung-up handset 1.

According to the invention the cradle 5 can conduct and/or scatter light. This means that the cradle 5 itself is not illuminated but can be made to illuminate or glow by means of an additional light source. Here the light source is one or more LEDs 6 as show in FIG. 2. Light emitted by the LEDs 6 as shown at 12 is conducted into the cradle 5 to ensure that the cradle 5 is illuminated when the LEDs 6 are switched on.

To this end the cradle 5 is formed as a part that is separate from the housing 2. In fact, the cradle 5 is a plastic part made from an injection-molded transparent thermoplastic material such as polycarbonate. The cradle 5 may be solid or have one or more hollow spaces or cavities. Both arms 5a may be cast from the same transparent plastic in one piece with the base 5b As shown in FIG. 3 one or both of the arms may be enclosed by part of an appropriately shaped and generally transparent outer plastic casing 14. An LED 6' can be fitted to a hollow space or cavity of the fork arm 5a and is anchored in place with a transparent potting compound 15 that can be the same as the material of the enclosing casing 14 with regard to optical properties.

In the embodiment of FIGS. 2 and 2a the cradle 5 is solid, with the exception of the mounting holes 7. Mounting means or screw fasteners 8 may engage through the plate 3 into the mounting holes 7 to fix the cradle 5 on the base plate 3. In fact, the cradle 5 and both its arms 5a extend perpendicular or nearly perpendicular to the base plate 3 of the housing 2.

Both mounting holes 7 are in the arms 5a on both sides of the base 5b of the fork-shaped receiver cradle 5. In this manner the mounting holes 7 also function as nonhomogeneities inside the cradle 5. The light 12 conducted into the cradle 5 and emitted by the LED 6 is scattered at these nonhomogeneities. Furthermore, scattering particles or bodies such as shown at 17 in FIG. 2a may be imbedded in the cradle 5 when it is being injection molded. Similar the surface of the cradle can be roughed by a sand-blasting process using glass beads, sand, or the like.

FIG. 2 shows that the light source or LED 6 is carried on a printed circuit board 9 that also carries the keys 4 and any additional electronic/electric parts. All of the parts are mounted on this printed circuit board 9 by SMD (surface mounted device) technology. This also applies to the LEDs 6 such that during production of the printed-circuit or keypad board 9 that is required anyway, the light source or the LEDs 6 is/are mounted on it in one step.

The board 9 is mounted directly behind the base plate 3. A light conductor 10 is provided so that light 12 emitted by the LEDs 6 may be fed into the cradle 5 in front of the base plate 3. The light conductor 10 may be a cylindrical pin and fit tightly in a respective hole or aperture 11 in the base plate 3. The light 12 emitted by the LED 6 forms a light cone that has an apex angle of 60°. The tight fit of the cylindrical pins or conductors 10 ensures that the printed-circuit board 9 is hermetically enclosed between the base plate 3 and the housing base 2a and thus is protected from the outside environment.

So that all light within the light cone 12 may be fed into the light conductor 10, it is equipped with a lens 13 at its rear end facing the respective LED 6. Both a concave and convex shape of the lens 13 may be used. Furthermore, the lens 13 may be formed directly by the light conductor 10 and made during production thereof. The light conductor 10 is a cylindrical rod, also made from a thermoplastic material in the case of this example, which is shaped to form the lens 13. In any case, the light or the light cone 12 emitted by the LED 6 is fed nearly completely into the light conductor 10.

Since the light conductor 10 is polished at its front end, the light 12 is all conducted forward into the interior as indicated in FIG. 2. The light exits the light conductor 10 at the inner end of the light conductor 10 opposite the lens 13 like a fiber optic cable. Since the flat back face of the cradle 5 directly engages the planar front end of the light conductor 10, the light 12 emitted by the LED 6 enters the cradle 5 directly and nearly without loss. This is especially so since the light conductor 10 and the cradle 5 are compatible with one another with respect to optical properties (especially with regard to refractive index).

The nonhomogeneities present in the form of mounting holes 7 and the optionally inserted scattering bodies 17 within the cradle 5 and/or the roughness on the surface of the cradle 5 ensure that the light 12 fed into the cradle 5 exits over the entire surface thereof in a practically homogenous manner. This causes the entire cradle 5 to, in effect, glow, emitting light from every surface.

Since the housing 2 is equipped with the transparent cover shell or door 2b, the illumination or glowing of the cradle 5 may also be easily seen from a distance. The shape is selected such that the LEDs 6 are actuated synchronously with the an incoming ring signal and that the cradle 5 pulses according to the ring signal. By using LEDs 6 emitting light in different colors, any desired signal colors may be selected for the optical pulsing. Of course, any embodiment in various different colors is conceivable. In this case, for example, a multicolor LED 6 will be used.

The arms 5*a* positioned on both sides of the handset 1, or the cradle 5 ensure that an incoming call is easily optically recognized. This occurs in a protected environment over a long service life.

I claim:

1. A telephone comprising:
   a housing base;
   a base plate fixed in the housing base and formed with a throughgoing hole;
   a handset;
   a cradle fork formed separately from the housing base and base plate, constructed to transmit and emit light, and formed of transparent plastic with a pair of arms that can embrace and fit with the handset in an on-hook position thereof;
   means for fastening the fork to the base to one side of the base plate;
   a light source in the housing to the other side of the base plate at the hole;
   a light conductor fitted to the hole, juxtaposed with the cradle fork, and oriented to receive light from the light source and transmit the received light through the base plate into the cradle fork for emission by the arms thereof; and
   means to the other side of the base plate in the housing base connected to the light source to energize same and feed light therefrom into the cradle fork for emission by the arms thereof.

2. The telephone defined in claim 1, wherein the means for fastening includes fasteners fixing the cradle fork to the base plate and therethrough to the base.

3. The telephone defined in claim 2 wherein the base plate is formed with holes in which the fasteners are seated.

4. The telephone defined in claim 3 wherein the cradle fork is solid except for the holes in which the fasteners are seated.

5. The telephone defined in claim 1, wherein the cradle fork is provided with a casing and is formed with at least one cavity covered by the casing.

6. The telephone defined in claim 5, further comprising another light source at least partially in the cavity.

7. The telephone defined in claim 6 wherein the cavity is filled with transparent potting around the light source in the cavity.

8. The telephone defined in claim 1, wherein a surface of the cradle fork is roughened to emit light.

9. The telephone defined in claim 1, wherein the means connected to the light source includes a circuit board between the base and the base plate.

10. The telephone defined in claim 9, wherein the light source is at least one light-emitting diode on the circuit board.

11. The telephone defined in claim 9, wherein the conductor plugs the hole in the base plate, and the base plate and housing base hermetically seal in the circuit board.

12. The telephone defined in claim 1, wherein the housing includes a transparent cover door fittable over the cradle fork and the handset.

13. The telephone defined in claim 1, wherein the housing fork is generally U-shaped and formed unitarily of one piece of the transparent plastic.

* * * * *